Sept. 15, 1936.  C. H. HAVILL ET AL  2,054,377
DRIVING MECHANISM
Filed Oct. 3, 1932
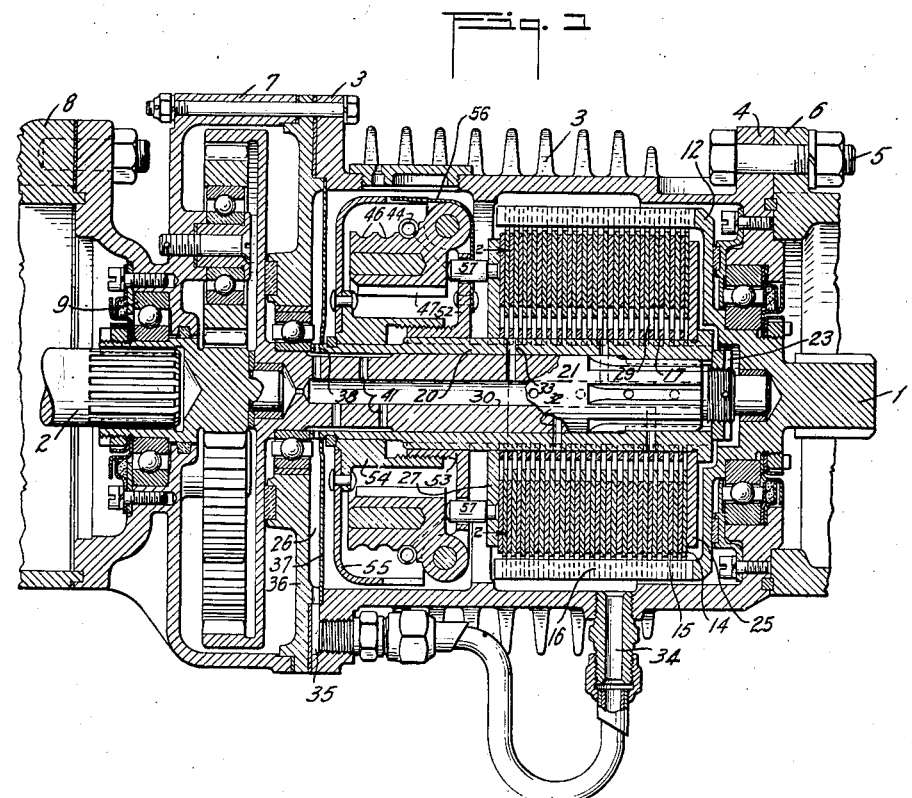
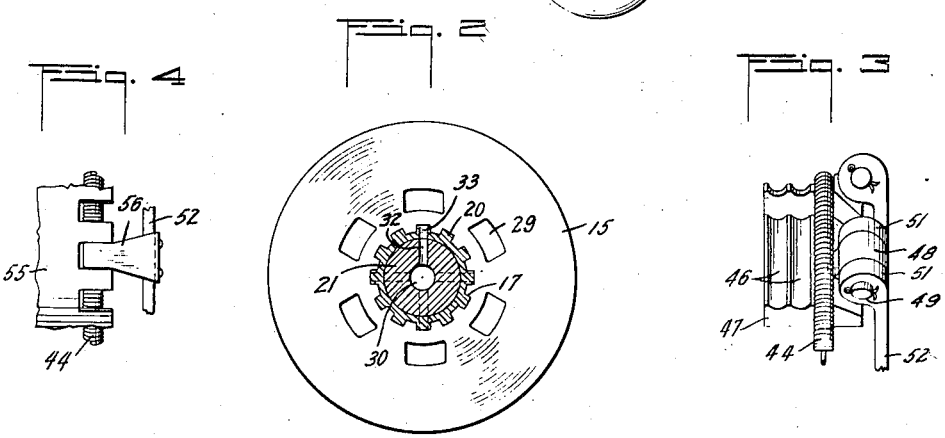
INVENTORS.
Clinton H. Havill
Albert S. Walton
BY
ATTORNEY.

Patented Sept. 15, 1936

2,054,377

UNITED STATES PATENT OFFICE 2,054,377

DRIVING MECHANISM

Clinton H. Havill, South Orange, and Albert S. Walton, East Orange, N. J., assignors, by mesne assignments, to Eclipse Aviation Corporation, East Orange, N. J., a corporation of New Jersey Application October 3, 1932, Serial No. 636,040

8 Claims. (Cl. 192—104)

This invention relates to driving mechanism and more particularly to devices in which relative rotation is possible between the driving and driven members.

An object of the invention is to provide novel means for maintaining the driven member of a driving mechanism at a constant speed of rotation, notwithstanding changes in the speed of rotation of the driving member.

A further object is to provide in a driving mechanism of the foregoing character, novel means operable in response to change in speed for controlling the speed of the driven member.

Another object of the invention is to provide a driving mechanism embodying means for varying the ratio between the speed of the driving and driven members without resorting to the use of shiftable gears or similar speed changing devices.

Another object of the invention is to provide in a driving mechanism of the foregoing character, novel means for preventing overheating of the parts thereof, and at the same time affording lubrication and creating a hydro-static pressure in the cooling and lubricating fluid, said pressure being variable in accordance with the speed of the mechanism and operative by reason of such variation to vary the torque transmitting capacity of the mechanism in such a manner as to tend to maintain the driven member at a substantially constant speed.

Another object of the invention is to provide a novel friction clutch mechanism in which the clutch engaging pressure is opposed by a combination of centrifugal weights and a body of fluid constantly in motion adjacent the friction elements, and operating to exert a friction reducing effect on said friction elements in response to action of centrifugal force on said fluid.

These and other objects and advantages to be derived from the use of the invention herein disclosed reside in the inter-relation and method of operation of the parts, and will become apparent upon inspection of the following specification when read with reference to the accompanying drawing, wherein the preferred embodiment of the invention is illustrated. It is to be expressly understood, however, that the drawing is for the purpose of illustration only and is not to be construed as a definition of the limits of the invention, reference being had for this purpose to the appended claims.

In the drawing,

Fig. 1 is a central longitudinal section through a device embodying the invention;

Fig. 2 is a transverse sectional view taken along the line 2—2 of Fig. 1;

Figs. 3 and 4 are detail views of certain features.

Referring to the drawing and particularly to Fig. 1, the invention is illustrated as embodied in a driving mechanism comprising a driving member 1, a driven shaft 2, and a plurality of intermediate members of novel construction drivably connecting the members 1 and 2, and enclosed in a finned casing 3 having a flange 4 provided with an opening through which suitable fastening means 5 may be inserted for attachment to a suitable supporting flange 6. At the opposite end the casing 3 is preferably provided with a second flange through which pass bolts adapted to hold an end plate 7 which thus serves as a coupling between the casing 3 and the housing 8 of a generator or other device to be driven, as well as serving as a support for a ball bearing member 9 in which the driven shaft 2 is rotatably mounted.

As above suggested, the invention contemplates the provision of novel means for drivably connecting the shafts 1 and 2 to permit relative rotation of the two shafts through the instrumentality of novel friction driving connections. Such driving connections preferably take the form of a driving barrel 12 drivably connected to the driven member 2 by a set of friction plates which in the form shown consists of a plurality of inter-leaving metallic discs 14 and 15, the former being splined to the splines or slots 16 in the barrel 12 and the latter being similarly splined as indicated at 17, to a sleeve 20 splined on the intermediate drive shaft 21, as shown in Figs. 1 and 2.

The drive shaft 21 has threaded thereon a nut 23 adapted to hold in place the sleeve 20. An abutment plate 25 engages a shoulder on sleeve 20 thereby acting to resist axial movement of the clutch discs, a similar plate 27 being provided at the opposite end of the clutch assembly to retain the clutch discs in frictional engagement, the axial pressure thereon depending upon the action of the novel control means to be described. The discs 15 are provided with angularly spaced openings 29, as shown best in Fig. 2, through which openings there is a comparatively free flow of the lubricating and cooling oil with which the mechanism is supplied in an amount sufficient to occupy a substantial portion of the free space, while at the same time permitting constant circulation in a path which extends through the central bore 30 in the shaft 21, the radial openings 32 communicating with the registering openings 33 in the sleeve 20, thence through the openings 29 and along the surfaces of the discs 14 and 15 toward the outer peripheries of said discs, such radial flow being expedited by the centrifugal force exerted upon the oil. The oil is then free to enter the conduit 34 and thus pass into the annular space 35 provided between the transverse partition 36 and a diaphragm 37 held in position between the wall 36 and an annular ledge formed on the casing 3 and acting to direct the flow of oil from the chamber 26 back to the central bore 30 of the shaft 21 by way of radial apertures 38 in the sleeve 20, and the radial apertures 41 in the shaft 21.

From the foregoing it will be apparent that that portion of the lubricating and cooling fluid flowing along the surfaces of the clutch discs 14 and 15 will be subject to centrifugal force thereby creating a hydro-static pressure in said oil tending to separate the discs 14 and 15 and reducing the torque transmitting capacity thereof in an amount which will vary as the square of the speed of rotation of said discs although such reduction will be modified slightly by the viscous drag of the oil, which drag will tend to transmit a certain amount of torque in addition to that produced by the friction of the discs. The means opposing the separating action of the oil upon the discs, and maintaining an adjustable pressure thereupon, preferably includes a coiled spring 44 (Figs. 1 and 3) engageable with any desired one of a plurality of grooves 46 provided on the outer arcuate surfaces of a plurality of weighted members 47 having apertured ears 48 for the reception of pins 49 providing a pivotal mounting for the weights in the corresponding ears 51 provided at equal intervals about the circumference of a plate 52, the latter having a hub 53 (Fig. 1) the interior surface of which is splined to the sleeve 20, to be movable axially thereof and to rotate in unison therewith. The member 52 is normally held in the position to which it is adjusted relative to plate 27 by the adjusting sleeve 54 rotatably mounted on shaft 20 and threadedly engaging the hub 53, and at its opposite end receiving a cage 55 the outer rim of which is slotted (Figs. 1 and 4) to receive a tapered retainer strip 56 extending from plate 52. The plate 52 is further provided with openings in line with the weights 47 to permit the passage therethrough of studs 57, the ends of which are embedded in plate 27, as indicated in Fig. 1.

It will thus be seen that the weights 47 act with the oil passing between the discs to oppose the spring 44 and tend to reduce the torque transmitting capacity whenever the rotary speed exceeds the normal amount, the oil exerting a pressure axially to tend to move the weights outwardly against the oppositely directed force of the springs 44. The result will be a certain degree of slippage between the adjacent elements of the two sets of friction discs and a corresponding retardation of the driven shaft 21 with respect to the driving shaft. Such retardation will reduce the centrifugal force acting on the weights, as well as that acting on the oil, until such force is brought back to the value at which it is completely balanced by the oppositely directed force of the spring 44, whereupon the condition of virtual positive drive is again established. It will be noted that the radially flanged portion of cage 55 serves to prevent an excess expansive condition of the spring 44 due to centrifugal action of the weights.

The cycle of events just described will of course be repeated on every occasion when the rotating parts depart from the predetermined normal speed. Hence it is apparent that on every such tendency the control means above described will come into action to nullify such tendency and thereby maintain the driven shaft 2 at a substantially constant speed.

There is thus provided a novel driving mechanism which is effective to maintain a driven member at constant speed, within desired limits, by the use of a compact symmetrically arranged mechanism which entails the use of comparatively few parts, which is relatively inexpensive to manufacture, readily assembled or disassembled, and which possesses the further desirable quality that it can be adapted to a variety of uses and applications. Thus for example, although especially useful for driving a generator or other dynamo electric machine or accessory of an automotive vehicle, it may also be applied as a drive for any machinery where a constant speed is desirable and where the prime mover is subject to variations in speed.

While the embodiment of the invention herein illustrated possesses a high degree of merit from a practical, as well as from other viewpoints, it is nevertheless contemplated that changes in construction and arrangement of parts will suggest themselves to persons skilled in the art in the light of the foregoing disclosure and it is to be understood that such means are within the scope of the invention herein disclosed. Thus, in place of the gear train shown as connecting shaft 21 and driven shaft 2, a direct connection may be substituted.

Likewise other changes may be made in the form, details of construction, arrangement of parts and the uses to which they are applied, without departing from the spirit of the invention, or the scope of the appended claims.

What is claimed is:

1. A driving mechanism comprising a driving drum, a driven shaft concentric with said drum, connecting means including friction units having alternate operative connection with said drum and shaft, means for directing a fluid flow along the friction surfaces of said friction units to exert thereupon a separating pressure which varies in accordance with the speed of rotation of said units and thereby operates to produce a corresponding variation in the torque transmitting capacity of said friction units, means including weighted members normally maintaining a predetermined clamping pressure on said friction members, and resilient means on said weighted members opposing movement thereof out of pressure exerting relation to said friction units.

2. A driving mechanism comprising a driving drum, a driven shaft concentric with said drum, connecting means including friction units having alternate operative connection with said drum and shaft, a plurality of rotatable and pivotally mounted weights normally transmitting a predetermined clamping pressure to said units, resilient means surrounding and engaging all of said weights and operative to produce such clamping pressure and prevent movement thereof about their pivotal axes so long as the rotary speed there is maintained within a predetermined range, and means for removing the heat generated by the inter-engagement of said friction units, said last named means further operating to tend to cause such pivotal movement of said weights.

3. In a device of the class described, a driving member, a driven member concentric therewith, a plurality of friction plates constituting a driving connection between said members, means comprising weight elements and a toroidal spring encircling said weight elements and driven member and acting through the instrumentality of said weight elements to exert torque transmitting pressure upon said friction plates, and means for directing a fluid under hydrostatic pressure through the friction plate assembly to vary the torque transmitting capacity thereof in accordance with variations in speed.

4. In a device of the class described, a driving member, a driven member concentric therewith, a plurality of friction plates constituting a driving connection between said members, a toroidal spring encircling said driven member and laterally spaced from said friction plates, means including weight elements acted upon by said spring to exert a clamping effect on said friction plates, and means for directing a fluid under hydrostatic pressure through the friction plate assembly to vary the torque transmitting capacity thereof in accordance with variations in speed.

5. In a device of the class described, a driving member, a driven member concentric therewith, a plurality of friction plates constituting a driving connection between said members, a toroidal spring encircling said driven member and laterally spaced from said friction plates, means acted upon by said spring to exert a clamping effect on said friction plates, said means comprising a plurality of weighted members maintained in spaced relation about said driven member and adapted to rotate therewith, and means for directing a fluid under hydrostatic pressure through the friction plate assembly to vary the torque transmitting capacity thereof in accordance with variations in speed.

6. In a device of the class described, a driving member, a driven member concentric therewith, a plurality of friction plates constituting a driving connection between said members, means exerting driving pressure upon said plates, said means including weight elements encircling said driven member in laterally spaced relation to said friction plates, and means for causing a fluid under hydrostatic pressure to flow in a radial direction through the friction plate assembly to vary the torque transmitting capacity thereof in accordance with variations in speed.

7. In a device of the class described, a driving member, a driven member, a plurality of friction elements constituting a driving connection between said members, means exerting driving pressure upon said elements, said means including weight elements in spaced relation to said friction elements, and means for causing a fluid under hydrostatic pressure to flow in a radial direction through the friction element assembly to vary the torque transmitting capacity thereof in accordance with variations in speed.

8. In a device of the class described, a driving member, a driven member, a plurality of friction elements constituting a driving connection between said members, means exerting driving pressure upon said elements, said means including elements encircling one of said members and disposed in spaced relation to said friction elements, and means for causing a fluid under hydrostatic pressure to flow in a radial direction through the friction element assembly to vary the torque transmitting capacity thereof in accordance with variations in speed.

CLINTON H. HAVILL.
ALBERT S. WALTON.